July 14, 1936.  H. J. BURNISH  2,047,254
MACHINE AND METHOD FOR ELECTRICALLY WELDING TUBES
Filed Oct. 7, 1931
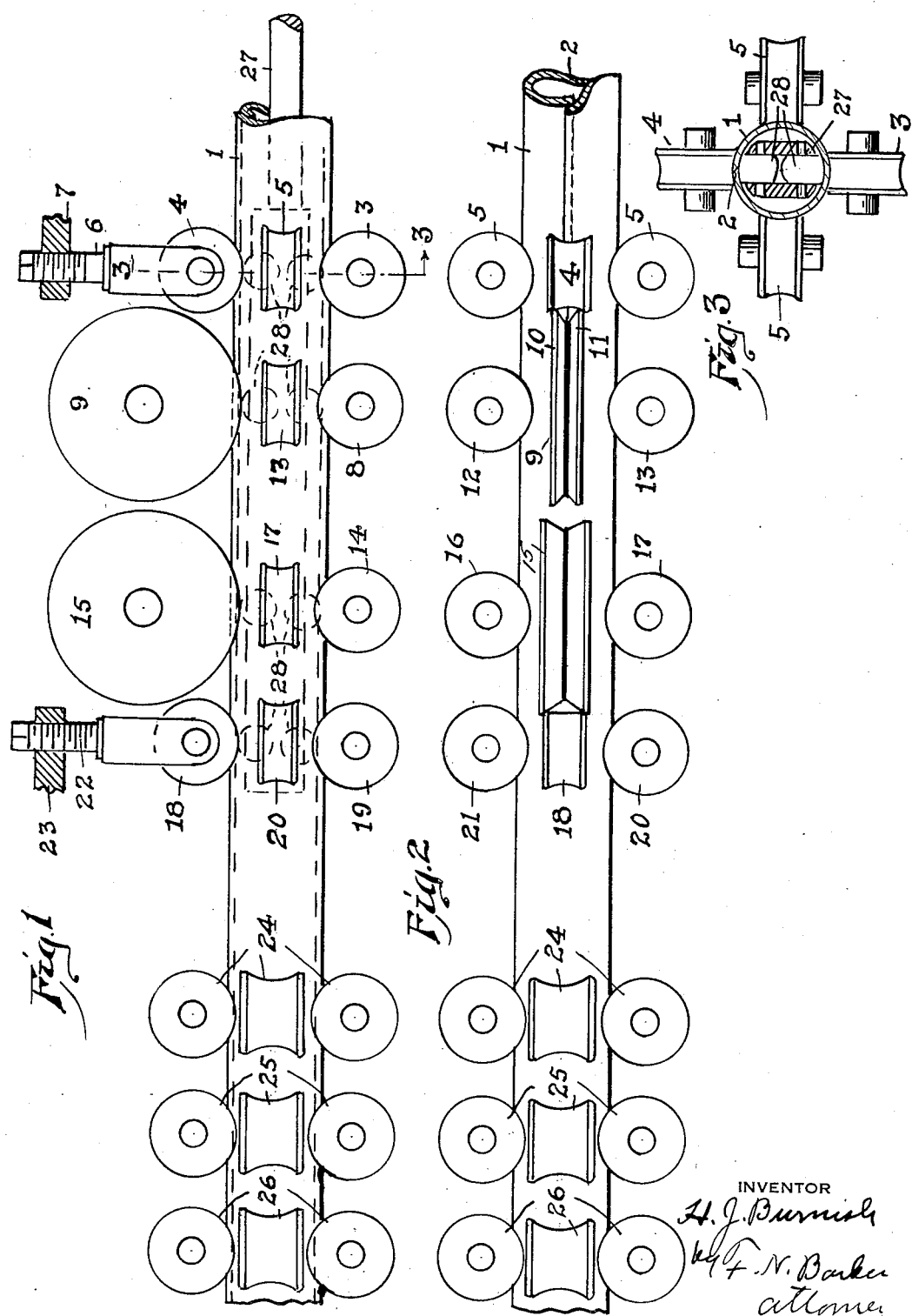
INVENTOR
H. J. Burnish
By F. N. Barker
Attorney Patented July 14, 1936

2,047,254

UNITED STATES PATENT OFFICE 2,047,254

MACHINE AND METHOD FOR ELECTRICALLY WELDING TUBES

Howard J. Burnish, Sewickley, Pa., assignor to Spang, Chalfont & Company, Inc., Pittsburgh, Pa., a corporation of Pennsylvania Application October 7, 1931, Serial No. 567,378

17 Claims. (Cl. 219—6)

This invention relates to machines and methods for the production of steel tubes. More particularly the invention relates to machines and methods for the electric welding of lapped longitudinal seams.

The principal object of this invention is to produce a highly efficient weld by a machine and a method which take into consideration the metallurgical characteristics of the material from which the tube is made, particularly when subjected to pressure and repeated heating. More particularly another object is to subject a tube being welded to heat treatment following the welding of the seam as hereinafter set forth in detail. Another object is to prepare the overlapping edges of the tubular skelp which is to be formed into a welded tube by compressing the lapped edges so as to make their contacting surfaces in uniform engagement from the inside to the outside of the skelp and for the entire length of the seam. Other objects appear hereinafter.

Referring to the accompanying drawing, Fig. 1 diagrammatically shows in side view an apparatus and method by which this invention may be practiced. Fig. 2 is a plan view of Fig. 1 with the adjusting device for the upper pressure rolls omitted. Fig. 3 is a section on the line 3—3 of Fig. 1.

A formed tube or tubular skelp 1 is fed longitudinally through the machine, the open or unwelded seam 2 being uppermost. The tube is first fed toward the left and between the lower roll 3 and the upper roll 4, the latter roll being in engagement with the tube for a short distance from each side of the seam 2. The tube is also fed at the same time between the lateral rolls 5 having their axial centers in substantially the same plane as the axial centers of the rolls 3 and 4. The roll 4 is provided with some adjusting means indicated by the screw 6 and the nut 7.

From the pass between the rolls 3 and 4, the tube 1 passes to the welding position at which it rests upon the roll 8 and the rolling contact device 9 rests upon the tube directly opposite the roll 8. The rolling contact device comprises a pair of rotary contacts 10 and 11 insulated from each other, one contact engaging the surface of the pipe at one side of the seam 2 and the other engaging the same at the opposite side of the seam. I do not limit this invention to any particular construction of the device 9 though I prefer that shown in my application Serial Number 562,079, filed September 10, 1931. Two rolls 12 and 13 press against the opposite sides of the tube 1. The longitudinal axes of the roll 8, the device 9, and the rolls 12 and 13 are preferably in a vertical plane lying at right angles to the tube.

The tube passes next to the roll 14 upon which it rests, this roll being directly below the reheating device 15 preferably constructed in the same manner as the device 9. Rolls 16 and 17 press against the opposite sides of the tube 1, the longitudinal axes of the device 15 and the rolls 14, 16 and 17 lying substantially in the same vertical plane which is at right angles to the tube 1.

The tube 1 then passes between the upper and lower rolls 18 and 19, the opposite sides of the tube being pressed inwardly by the rolls 20 and 21. All of these rolls lie in the same vertical plane which is at right angles to the tube. The roll 18 is adjusted vertically by any suitable means, such means being indicated conventionally by the screw 22 and the nut 23. The pipe then passes through sets of ironing rolls, each set forming a throat through which the pipe passes. Each set comprises four rolls arranged around the tube and 90° apart. The rolls of the first set are marked 24, of the second set 25, and of the third set 26.

As the tube 1 passes between the rolls 3 and 4 where it is at its first station, the overlapping edges of the pipe are pressed together with sufficient force to cause an even engagement throughout the contacting surfaces, as before explained.

As the pipe passes between the roll 8 and the rotary contacts 10 and 11 where it is at its second station, welding current passes from one of these contacts and thence across the seam 2 to the other contact in a manner well understood by those acquainted with the pipe welding art. While I do not limit myself to any definite welding apparatus, I prefer that shown in my application Serial Number 566,469, filed October 2, 1931. As the contacting edges of the tube 1 have been made by the rolls 3, 4, and 5 to fit each other accurately, rotary contacts 10 and 11 heat the metal at opposite sides of the seam evenly and produce an even weld.

While the tube 1 is passing from the welding station to the re-heating or third station which is at the point where the tube is engaged by the re-heating device 15, its temperature is lowered through the critical range to a point somewhat below recalescense. The rotary re-heating device 15 is not a rotary welding device, but is a device for electrically re-heating the tube to a minimum degree above the upper critical point. The pipe then passes quickly to the fourth station where it is engaged by the rolls 18 and 19, Here mechanical work is performed on the heated material by the roll 18, the opposite side of the tube being supported by the roll 19. The working by the roll 18 should be finished at the lower limit of the critical range or at a temperature slightly below the critical range to produce the greatest refinement of crystalline structure. It has been found that the grain structure at the lines of demarcation between the heated and the normal metal, that is, at the edges of the zone highly heated at the welding station, is large compared with the grain structure at the weld, whereby lines of comparative weakness are formed at each side of the said zone. Accordingly, applicant re-heats the tube at each side of the welding line along a zone somewhat wider than that in which the grain growth occurred after the application of the welding heat. After the tube has cooled as described, the roll 18 compresses the re-heated zone so as to refine and equalize the grain structure, thereby refining the structure of the tube along the areas previously weakened by its treatment at the welding station. The second heating being lower than the first heating, the grain growth due to the second heating will not be as pronounced as the first heating.

A mandrel bar 27 lies within the tube 1 and carries at each station a pair of rolls 28, the members of each pair lying one directly above the other. One pair of rolls lies directly between the rolls 3 and 4. Another pair lies directly between the roll 8 and the device 9. Another pair lies directly between the roll 14 and the rotary re-heating device 15. Another pair lies directly between the rolls 18 and 19. Mandrels having pairs of rolls occupying positions like those described are well known and need not be further described.

A portion of the pipe in the vicinity of the weld should be cooled, as above stated, while the pipe is passing from the second station to the third station. This can be ensured by properly spacing the distances between the second and third stations or by applying cooled air to the welded portion of the pipe as it travels from the second to the third station.

While the hot working of the steel tube below the critical range would distort the grain structure causing a decrease in ductility and an increase in brittleness, nevertheless the metal will have sufficient strength for many useful purposes. Therefore, my method is useful whether the hot working terminates somewhat above or below the lower limit of the critical range. However, I prefer that the working shall be completed at the lower limit of the critical range or slightly above or below the same.

It is advisable that the first heating of the tube shall produce a complete weld and that the second heating be performed over a wider zone than that covered by the first heating. The second heating acts as a normalizing heat tending not only to iron out the weld, but also to serve as a normalizing operation for refining the grain structure.

I claim:

1. The method of producing electrically welded pipe from open seam tubular skelp which comprises the steps of progressively welding seam edges, and heating a zone including but substantially wider than the seam to a temperature approximating the critical range by passing an electric current through said material.

2. The method of producing electrically welded pipe from open seam tubular skelp which comprises the steps of progressively welding seam edges, heating the seam to a temperature approximating the critical range by passing an electrical current therethrough to anneal the same, and working the seam concurrently as it is being annealed to reduce the grain structure.

3. The continuous method of welding the contiguous surfaces of a tubular skelp to form a tube and of refining the grain structure in a longitudinal zone in the formed tube which includes the welded seam, while the work is continuously traveling, which method comprises successively performing the steps on succeeding portions of the work of welding said surfaces together by the application of heat and pressure and then reheating the material adjacent both sides of said seam to a temperature approximating the critical range by passing electrical currents across a zone of greater width and including the first mentioned zone and the welded seam whereby to reduce the grain structure previously enlarged by the welding step.

4. The continuous method of welding the contiguous surfaces of a tubular skelp to form a tube and of refining the grain structure of a longitudinal zone in the formed tube which includes the welded seam, while the work is continuously traveling, which method comprises successively performing the steps on succeeding portions of the work of welding said surfaces together by the application of heat and pressure and then reheating the material adjacent both sides of said seam to a temperature approximating the critical range by passing an electrical current across a zone of greater width and including the first mentioned zone and the welded seam whereby to reduce the grain structure previously enlarged by the welding step, and then subjecting the zone to working pressure to reduce the grain structure to greater fineness.

5. The continuous method of welding the contiguous surfaces of a tubular skelp to form a tube and of refining the grain structure of a longitudinal zone in the formed tube which includes the welded seam, while the work is continuously traveling, which method comprises successively performing on succeeding portions of the work the steps of welding said surfaces together by the application of heat and pressure and then reheating the material adjacent both sides of said seam to a temperature approximating the critical range by passing an electrical current across a zone of greater width and including the first mentioned zone and the welded seam whereby to reduce the grain structure previously enlarged by the welding step, and then before the temperature falls below the lower limit of the critical range, subjecting the zone to working pressure to reduce the grain structure to greater fineness.

6. In electrical tube welding apparatus, the combination of a welding throat comprising a pair of electrode rolls in spaced relation and insulated from each other, said electrode rolls being arranged to engage the contiguous surfaces of the tubular skelp and pressure rolls cooperating with the electrode rolls to maintain the tubular skelp in proper form during the welding step, and a grain-refining throat adjacent the welding throat and through which the continuously traveling work passes from the welding throat, said grain-refining throat comprising a pair of electrode rolls in spaced relation and insulated from each other, said last named electrode rolls being arranged to engage the welded tube further around the peripheral surface and on either side of the longitudinal seam than the welding electrode rolls whereby to pass electrical currents through said seam and the longitudinal zone of the tube contiguous to the seam to refine the grain of the metal, and grooved pressure rolls cooperating with the last mentioned electrode rolls to complete the second throat.

7. In electrical tube welding apparatus, the combination of a welding throat comprising a pair of electrode rolls in spaced relation and insulated from each other, said electrode rolls being arranged to engage the contiguous surfaces of the tubular skelp and pressure rolls cooperating with the electrode rolls to maintain the tubular skelp in proper form during the welding step, and a grain-refining throat adjacent the welding throat and through which the continuously traveling work passes from the welding throat, said grain-refining throat comprising a pair of electrode rolls in spaced relation and insulated from each other, said last named electrode rolls being arranged to engage the welded tube further around the peripheral surface and on either side of the longitudinal seam than the welding electrode rolls whereby to pass electrical currents across said seam and the longitudinal zone of the tube contiguous to the seam to refine the grain of the metal, and grooved pressure rolls cooperating with the last mentioned electrode rolls to complete the second throat, said throats being spaced apart to permit the traveling work to cool between the welding and the grain-refining steps.

8. In electrical tube welding apparatus, the combination of a welding throat comprising a pair of electrode rolls in spaced relation and insulated from each other, said electrode rolls being arranged to engage the contiguous surfaces of the tubular skelp and pressure rolls cooperating with the electrode rolls to maintain the tubular skelp in proper form during the welding step, and a grain-refining throat adjacent the welding throat and through which the continuously traveling work passes from the welding throat, said grain-refining throat comprising a pair of electrode rolls in spaced relation and insulated from each other, said last named electrode rolls being arranged to engage the welded tube further around the peripheral surface and on either side of the longitudinal seam than the welding electrode rolls whereby to pass electrical currents across said seam and the longitudinal zone of the tube contiguous to the seam to refine the grain of the metal, and grooved pressure rolls cooperating with the last mentioned electrode rolls to complete the second throat, and means for applying working pressure to the said zone as the tube passes from the grain-refining throat and before material cooling.

9. In electrical tube welding apparatus, the combination of a welding throat comprising a pair of electrode rolls in spaced relation and insulated from each other, said electrode rolls being arranged to engage the contiguous surfaces of the tubular skelp and pressure rolls cooperating with the electrode rolls to maintain the tubular skelp in proper form during the welding step, and a grain-refining throat adjacent the welding throat and through which the continuously traveling work passes from the welding throat, said grain-refining throat comprising a pair of electrode rolls in spaced relation and insulated from each other, said last named electrode rolls being arranged to engage the welded tube further around the peripheral surface and on either side of the longitudinal seam than the welding electrode rolls whereby to pass electrical currents across said seam and the longitudinal zone of the tube contiguous to the seam to refine the grain of the metal, and grooved pressure rolls cooperating with the last mentioned electrode rolls to complete the second throat, said throats being spaced apart to permit the traveling work to cool between the throats, and means for applying working pressure to the said zone as the tube passes from the grain-refining throat and before material cooling.

10. In electrical tube welding apparatus, the combination of a welding throat comprising a pair of electrode rolls in spaced relation and insulated from each other, said electrode rolls being arranged to engage the contiguous surfaces of the tubular skelp and pressure rolls cooperating with the electrode rolls to maintain the tubular skelp in proper form during the welding step, and a grain-refining throat adjacent the welding throat and through which the continuously traveling work passes from the welding throat, said grain-refining throat comprising a pair of electrode rolls in spaced relation and insulated from each other, said last named electrode rolls being arranged to engage the welded tube on either side of the longitudinal seam and to pass electrical currents across said seam and the longitudinal zone of the tube contiguous to the seam to refine the grain of the metal, and grooved pressure rolls cooperating with the last mentioned electrode rolls to complete the second throat.

11. In electrical tube welding apparatus, the combination of a welding throat comprising a pair of electrode rolls in spaced relation and insulated from each other, said electrode rolls being arranged to engage the contiguous surfaces of the tubular skelp and pressure rolls cooperating with the electrode rolls to maintain the tubular skelp in proper form during the welding step, and a grain-refining throat adjacent the welding throat and through which the continuously traveling work passes from the welding throat, said grain-refining throat comprising a pair of electrode rolls in spaced relation and insulated from each other, said last named electrode rolls being arranged to engage the welded tube on either side of the longitudinal seam and to pass electrical currents across said seam and the longitudinal zone of the tube contiguous to the seam to refine the grain of the metal, said last mentioned electrode rolls having a wider zone of contact with the tube than do the first mentioned electrode rolls, and grooved pressure rolls cooperating with the last mentioned electrode rolls to complete the second throat.

12. In a progressive electric welding machine, the combination of a rotatable electrode means for welding a longitudinal seam in a tubular blank and a second rotatable electrode means arranged to engage the blank to anneal the welded seam, said electrodes being arranged in tandem to successively engage the continuously traveling blank.

13. In a progressive electric welding machine, the combination of a rotatable electrode means for welding a longitudinal seam in a tubular blank and a second rotatable electrode means arranged to anneal a zone wider than and including the seam, said electrodes being arranged in tandem to successively engage the continuously traveling blank.

14. In a progressive electric welding machine, the combination of means for welding a longitudinal seam, and unitary means for subjecting the welded seam to an annealing temperature, and means for working the seam as it is being annealed.

15. The method of continuously heat-treating a welded seam along the longitudinal length thereof and the regions of enlarged grain structure bordering the seam, which comprises passing an electric current through the material across the seam and said regions progressively along the length thereof to heat the material to a temperature above the critical range of the material.

16. The method of continuously heat-treating a welded seam along the longitudinal length thereof and the regions of enlarged grain structure bordering the seam, which comprises passing an electric current through the material across the seam and said regions progressively along the length thereof to heat the material to a temperature above the critical range of the material, and simultaneously working said seam and said regions concurrently as they are annealed to refine the grain structure therein.

17. In an electric annealing machine for continuously heat treating a welded seam in metal, the combination of means for subjecting the welded seam to an annealing temperature, and means for working the seam concurrently as it is being annealed.

HOWARD J. BURNISH.

CERTIFICATE OF CORRECTION.

Patent No. 2,047,254.                                                           July 14, 1936.

HOWARD J. BURNISH.

It is hereby certified that the name of the assignee in the above numbered patent was erroneously written and printed as Spang, Chalfont & Company, Inc. whereas said name should have been written and printed as Spang, Chalfant & Company, Inc., of Pittsburgh, Pennsylvania, a corporation of Pennsylvania, as shown by the records of assignments in this office; and that the said Letters Patent should be read with this correction therein that the same may conform to the record of the case in the Patent Office.

Signed and sealed this 15th day of September, A. D. 1936.

Henry Van Arsdale (Seal)                                Acting Commissioner of Patents.